US012139371B2

(12) United States Patent
Li et al.

(10) Patent No.: US 12,139,371 B2
(45) Date of Patent: Nov. 12, 2024

(54) CONNECTING MECHANISM, ELEVATOR SHAFT MODULE AND ELEVATOR SYSTEM

(71) Applicant: Otis Elevator Company, Farmington, CT (US)

(72) Inventors: Bichun Li, Shanghai (CN); Qirui Wang, Shanghai (CN); Shenhong Wang, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 262 days.

(21) Appl. No.: 17/522,409

(22) Filed: Nov. 9, 2021

(65) Prior Publication Data

US 2022/0274804 A1 Sep. 1, 2022

(30) Foreign Application Priority Data

Mar. 1, 2021 (CN) ......................... 202110223691.1

(51) Int. Cl.
*B66B 11/00* (2006.01)
*E04B 1/58* (2006.01)

(52) U.S. Cl.
CPC ........ *B66B 11/0005* (2013.01); *E04B 1/5831* (2013.01)

(58) Field of Classification Search
CPC ..... B66B 11/0005; B66B 9/16; E04B 1/5831; E04B 1/34
See application file for complete search history.

(56) References Cited

U.S. PATENT DOCUMENTS

| | | | | | |
|---|---|---|---|---|---|
| 668,627 | A * | 2/1901 | Crow | B66F 11/04 | 182/148 |
| 3,313,376 | A * | 4/1967 | Holland, Sr. | E04G 1/20 | 187/241 |
| 3,650,078 | A * | 3/1972 | Jennings | E04G 11/48 | 52/646 |

(Continued)

FOREIGN PATENT DOCUMENTS

| | | | | |
|---|---|---|---|---|
| CN | 104760860 A | | 7/2015 | |
| CN | 109516325 A | * | 3/2019 | B66B 1/14 |

(Continued)

OTHER PUBLICATIONS

European Search Report for Application No. 21214688.0, Issued Jun. 21, 2022, 7 Pages.

*Primary Examiner* — Michael R Mansen
*Assistant Examiner* — Michelle M Mudwilder
(74) *Attorney, Agent, or Firm* — CANTOR COLBURN LLP

(57) ABSTRACT

A docking mechanism, an elevator shaft module, and an elevator system. The elevator shaft module and elevator system includes the docking mechanism. The docking mechanism includes a first docking element having a first adjusting element; and a second docking element having a second adjusting element, the first docking element is adapted to dock the second docking element in an adjustable manner, and the first adjusting element is adapted to engage the second docking element, such that a docking position between the first docking element and the second docking element is changeable by adjusting one of the first adjusting element and the second adjusting element.

8 Claims, 5 Drawing Sheets

(56) References Cited

U.S. PATENT DOCUMENTS

| | | | | | |
|---|---|---|---|---|---|
| 4,078,633 | A * | 3/1978 | Fahy | E04G 3/265 | 182/229 |
| 4,293,054 | A * | 10/1981 | Pieri | E04G 1/20 | 182/69.6 |
| 4,294,332 | A * | 10/1981 | Ready | E04G 1/20 | 182/132 |
| 5,271,482 | A * | 12/1993 | Walz | E04G 1/20 | 182/69.6 |
| 5,746,290 | A * | 5/1998 | St-Germain | B66F 11/04 | 182/130 |
| 6,540,048 | B1 * | 4/2003 | Muller | B66B 13/303 | 52/30 |
| 8,800,725 | B2 * | 8/2014 | Alois | B66B 19/002 | 29/469 |
| 8,905,190 | B2 * | 12/2014 | Stromland | B66B 9/187 | 182/141 |
| 9,297,173 | B2 * | 3/2016 | Spindler | E04G 11/28 | |
| 9,850,653 | B1 * | 12/2017 | Gerard | E04F 17/005 | |

FOREIGN PATENT DOCUMENTS

| | | | | |
|---|---|---|---|---|
| CN | 111779258 | A * | 10/2020 | |
| EP | 1321418 | A1 | 6/2003 | |
| KR | 20210017698 | A * | 2/2021 | |
| WO | 0223053 | A1 | 3/2002 | |
| WO | WO-2014040941 | A1 * | 3/2014 | B66B 11/0005 |
| WO | 2020001668 | A1 | 1/2020 | |

* cited by examiner

CONNECTING MECHANISM, ELEVATOR SHAFT MODULE AND ELEVATOR SYSTEM

FOREIGN PRIORITY

This application claims priority to Chinese Patent Application No. 202110223691.1, filed Mar. 1, 2021, and all the benefits accruing therefrom under 35 U.S.C. § 119, the contents of which in its entirety are herein incorporated by reference.

TECHNICAL FIELD

The present disclosure relates to the field of elevators. More specifically, the present invention relates to a docking mechanism, and further to an elevator shaft module and an elevator system including the docking mechanism.

BACKGROUND

With the development of society, multiple-story, and even high-rise buildings are getting more and more either in the living areas or in the business areas and production areas, etc. Elevator systems are installed in these buildings for transporting people or cargo between floors.

For buildings equipped with elevator systems, it is often desirable to set dedicated shafts structures for elevator systems in a building at the beginning of the building construction, and then install various components of the elevator systems to the shaft structure site at a later time of the building construction.

Moreover, a modular elevator shaft structure is also presented, most components of the modular elevator shaft structure are processed and pre-assembled into modules within the factory, requiring only a small amount of work to be performed at the construction site to complete the shaft installation of the elevator system.

SUMMARY

It is an object of a first aspect of the present invention to provide an improved docking mechanism.

It is an object of a second aspect of the present invention to provide an elevator shaft module comprising the docking mechanism of the first aspect described above.

It is an object of a third aspect of the present invention to provide an elevator system comprising the elevator shaft module of the second aspect described above.

It is an object of a fourth aspect of the present invention to provide another elevator shaft module comprising the docking mechanism of the first aspect described above.

It is an object of a fifth aspect of the present invention to provide an elevator system comprising the elevator shaft module of the fourth aspect described above.

In order to achieve the foregoing purpose, a first aspect of the present invention provides a docking mechanism, wherein the docking mechanism comprises: a first docking element having a first adjusting element; and a second docking element having a second adjusting element, wherein the first docking element is adapted to dock the second docking element in an adjustable manner, and the first adjusting element is adapted to engage the second adjusting element, such that a docking position between the first docking element and the second docking element is changeable by adjusting one of the first adjusting element and the second adjusting element.

Optionally, in the docking mechanism as previously described, the first adjusting element is a rack fixed to the first docking element, and the second adjusting element is a gear, the gear being disposed at the second docking element in a rotatable adjusting manner.

Optionally, in the docking mechanism as previously described, the first docking element is a first hollow tube, the second docking element is a second hollow tube, the rack protrudes from one end of the first hollow tube, the gear is disposed within one end of the second hollow tube by an adjustable spindle, and the rack is adapted to be guided between the gear and a sidewall of the second hollow tube into the end of the second hollow tube.

Optionally, in the docking mechanism as previously described, the spindle has an operating portion for rotating and adjusting the spindle.

Optionally, in the docking mechanism as previously described, the end of the first hollow tube includes a first extension portion extending longitudinally therefrom and parallelly spaced apart from the rack, a spacing between the rack and the first extension portion allowing the gear to access, and, the first extension portion is adapted to extend into the second hollow tube, and the first extension portion is adapted to be secured to the second hollow tube in a releasable manner.

Optionally, in the docking mechanism as previously described, the first extension portion has a connecting hole and the end of the second hollow tube has a slot corresponding to the position of connecting hole, the connecting hole being adapted to be secured with the slot by a screw.

Optionally, in the docking mechanism as previously described, the end of the first hollow tube includes a second extension portion extending longitudinally therefrom and parallelly spaced apart from the first extension portion, the second extension portion conforms to and holds the rack, and the second extension portion is adapted to extend into a second hollow tube, an outer profile shape formed by the first extension portion and the second extension portion matches the inner profile shape of the second hollow tube.

Optionally, in the docking mechanism as previously described, the first hollow tube and the second hollow tube are both square tubes.

Optionally, in the docking mechanism as previously described: the first docking element includes an indexing block and at least one swing lever serving as a first adjusting element, a first end of the swing lever being connected to the indexing block in an indexing pivotally adjustable manner; the second docking element includes a mechanical jack serving as a second adjusting element, a second end of the swing lever being connected to a top of the mechanical jack in a hinged manner.

Optionally, in the docking mechanism as previously described, the indexing block is provided with a guiding slot for guiding a swing of the swing lever, a pivot shaft shared by the swing levers is fixed to the indexing block through the guiding slot, and the indexing block has at least two indexing holes distributed around the pivot shaft and passing through the guiding slot, the swing lever being fixed to at least one of the indexing holes by an indexing shaft.

Optionally, in the docking mechanism as previously described, the mechanical jack has parallel top and bottom plates, supporting legs being fixed at the top plate and/or the bottom plate respectively, the supporting legs protruding from a first side of the top plate and/or the bottom plate, the supporting legs being parallel to a plane in which the top plate and/or the bottom plate are located and parallel to a swing plane of the swing lever.

Optionally, in the docking mechanism as previously described, the top plate and/or the bottom plate each has a vertical edgefold at an edge of the first side thereof, the supporting leg being formed at the edgefold.

In order to achieve the foregoing purpose, a second aspect of the present invention provides an elevator shaft module, wherein the elevator shaft module comprises the docking mechanism of any of items 1-8, the first docking element and the second docking element being located at a connecting end of a frame of the elevator shaft module, respectively.

In order to achieve the foregoing purpose, a third aspect of the present invention provides an elevator system, wherein the elevator system comprises the docked elevator shaft module of the second aspect as previously described, wherein docking of adjacent elevator shaft modules is achieved by a first docking element and a second docking element of each other.

In order to achieve the foregoing purpose, a fourth aspect of the present invention provides an elevator shaft module, wherein the elevator shaft module comprises the docking mechanism of any of items 1 and 9-12 as previously described, a first docking element of the docking mechanism being fixed to a side of a frame of the elevator shaft module.

Optionally, in the elevator shaft module as previously described, the elevator shaft module has a supporting bolt protruding outwardly from its back side frame.

In order to achieve the foregoing purpose, a fifth aspect of the present invention provides an elevator system, wherein the elevator system comprises the elevator shaft module as described in the fourth aspect, wherein a second docking element of the docking mechanism is supported at a respective floor of a building shaft of the elevator system.

BRIEF DESCRIPTION OF DRAWINGS

The disclosure of the present invention will become more apparent with reference to the accompanying drawings. It should be understood that these drawings are for illustrative purposes only and are not intended to limit the protective scope of the present invention. Wherein.

DETAILED DESCRIPTION

Figure 1:
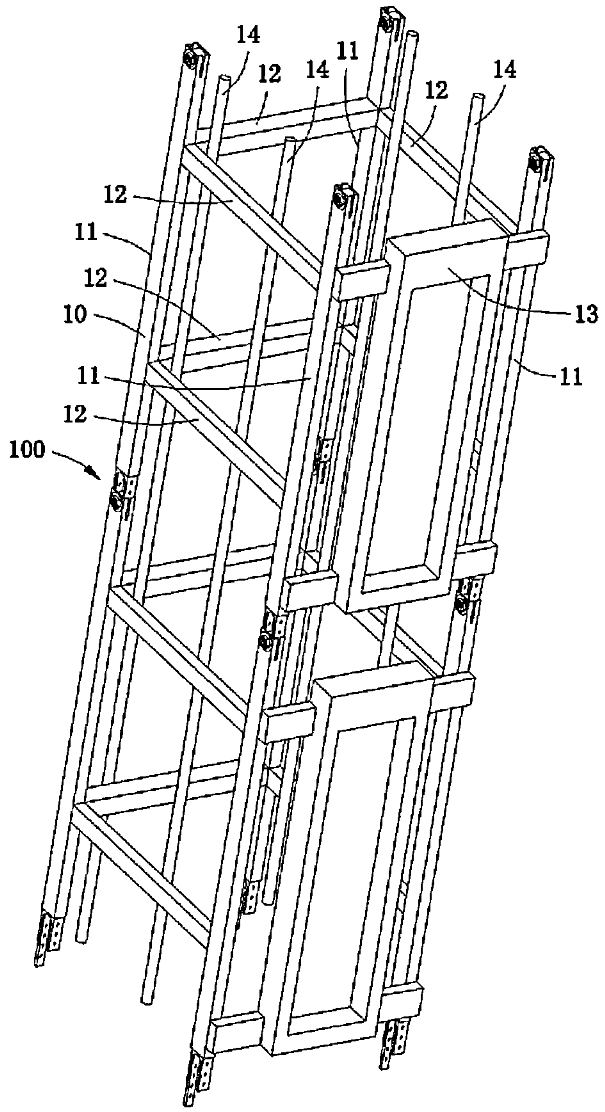
FIG. 1 schematically illustrates, in a perspective view, a docking mechanism and an elevator shaft module according to one embodiment of the present invention.

Detailed Descriptions of the present invention are described in detail below with reference to the accompanying drawings. In the drawings, like reference numerals designate identical or corresponding technical features.

For the sake of brevity and illustrative purposes, this specification describes the principles of the invention with reference to examples in the accompanying drawings. However, those skilled in the art should appreciate that the same principles may be applied to the docking of various types of modular elevator systems and that these same principles may be implemented therein, and that any such application does not depart from the spirit and scope of the present invention.

Expressions such as "first", "second" and the like referred to in the specification are used solely for the purpose of nomenclature, description, or differentiation, and are not to be construed as indicating or implying the relative importance of corresponding members, nor necessarily limiting the number of corresponding members.

While the solutions and features in this application are disclosed in conjunction with only one or more of several embodiments/examples, such feature may be combined with one or more other features of other embodiments/examples as may be desired and/or advantageous for any given or identifiable function. The following description is, therefore, not to be considered to have the sense of limiting the scope of the present application.

Some aspects of the present application relate to a modular elevator system. In general, a shaft module of the modular elevator system includes prefabricated bottom modules, top modules, and at least one middle module. In field installations, the bottom module is mounted at the bottom of the elevator shaft and is also referred to as a pit module. The top module is mounted at the top of the elevator shaft, and one or more middle modules are removably stacked or stowed between the bottom module and the top module. For example, the bottom module, the top module, and the plurality of middle modules may be fabricated at the fabrication site respectively, then transported to the installation site, and hoisted successively from the bottom (with lifting ring(s) disposed on each module). Each module may be sized to correspond to a floor. For example, the middle module may have a size corresponding to a single floor of the building, the top module may have a size corresponding to an elevator room on a top floor of the building, and the bottom module may have a size corresponding to the elevator room at the bottom of the building.

The bottom module, the top module, and the middle module may each include a frame structure made of, for example, steel structural parts, and the frame structure may include vertical structural parts in a vertical direction and/or horizontal structural parts in a horizontal direction. These structural parts are attached to one another so as to define a stereo-shaped frame, defining a space inside the frame for receiving the car, and with these frames, various shaft components of the elevator system and floor hall components may be installed.

For example, the frame structure of the bottom module may be mounted with one or more of the following components: speed governor, tensioner, compensating rope, guiding device, lighting system, power system, intercom system, service entrance, and the like. For example, the frame structure of the top module may be mounted with one or more of the following components: traction machine, lifting rope, motor, and the like. For example, the frame structure of the middle module may be mounted with one or more of the following components: guide rail, landing door, or the like. These relevant details regarding the frame structures of the bottom module, the top module, and middle module are not repeated herein.

In some embodiments of the modular elevator system according to the present invention, docking between each shaft module and between the shaft module and the elevator shaft may be achieved through a docking mechanism.

FIG. 1 schematically illustrates, in a perspective view, a docking mechanism and an elevator shaft module according to one embodiment of the present invention.

Two middle modules 10 are schematically illustrated in the figure. Each of the middle modules 10 includes a frame constructed of, for example, steel structural parts, or the like, with a vertical structural part 11 and a horizontal structural part 12 attached to each other. The specific attachment methods include, but not limited to, welding or the like. In this example, the frame may be configured in a generally cubic shape so as to define a space inside for receiving the car. The frame comprised of the vertical structural part 11 and the horizontal structural part 12 provides a front side, a back side, a left side, and a right side for the middle module 10. Here, the front, back, left, right are orientations relative to the elevator car, with the side of the landing door of the elevator system being the front side, the opposite side of which being the back side. A landing door 13 is provided at the front side of the middle module 10; a guide rail 14 is provided inside of the middle module for guiding the operation of the car of the elevator.

The two middle modules 10 in the figure are docked by a docking mechanism 100. In the illustrated example, four docking mechanisms 100 are employed between every two middle modules 10, and are disposed between the docked vertical structural parts 11 of the two middle modules 10, respectively. The provision of these docking mechanisms is capable of adjusting the height of modules at millimeter level, facilitating accurate adaptation to the floor height error of the building, while the structural adjustment design is reliable, low in cost, and maintains good quality of the modular frame connection.

In the illustrated example, each docking mechanism 100 may have the same relative height position. In optional embodiments, each docking mechanism may also be disposed at a different height. Optionally, docking is performed at a pair of two middle modules. The heights of these docking mechanisms 100 are located between the upper and lower landing doors instead of opposite to the landing doors, facilitating docking operations.

It may be appreciated that while the docking mechanism between the middle modules is described in the illustration of the present application, in specific embodiments, such docking mechanisms may also be used between the bottom module and the middle module, the middle module and the top module, respectively, to enable the same good technical effect.

It should be noted here that the docking mechanisms of various embodiments of the present application are not limited to be applied in the shaft module or elevator system shown in FIG. 1. The described shaft module or elevator system is only an example of application, and these docking mechanisms may be applied to any suitable docking occasion.

Figure 2:
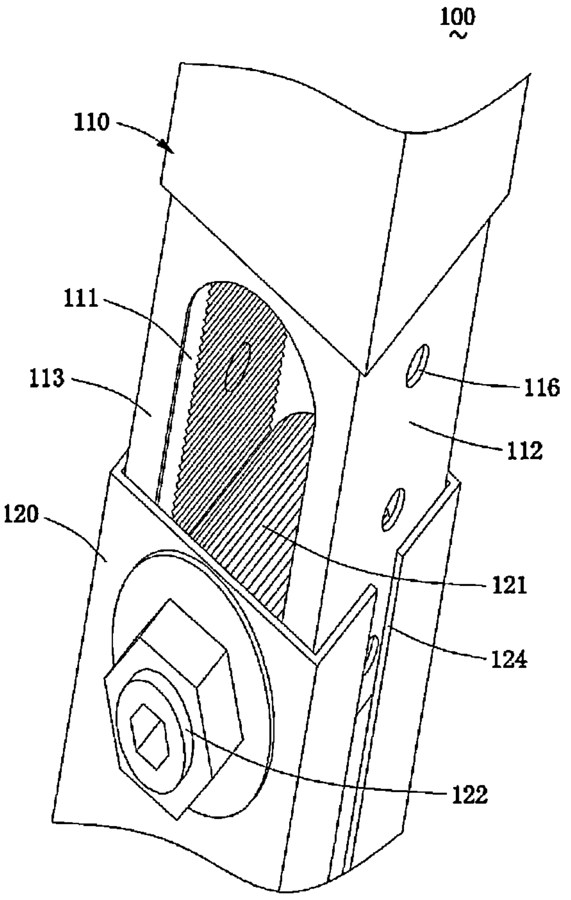
FIG. 2 schematically illustrates, in a perspective view, a docking mechanism according to one embodiment of the present invention.

FIG. 2 schematically illustrates, in a perspective view, a docking mechanism according to one embodiment of the present invention.

As can be seen in the figure, the docking mechanism 100 includes a first docking element 110 and a second docking element 120. In this example, the first docking element 110 and the second docking element 120 are both square hollow tubes. The first docking element 110 and the second docking element 120 may be end portions of the vertical structural part of the shaft model as can be seen in FIG. 1, and integrally formed at the end of the vertical structural part 11, or fixed or integrated to the end of the vertical structural part 11 in any manner.

According to the example shown in FIG. 2, the first docking element 110 and the second docking element 120 may be located at both ends of the same vertical structural part 11 to enable end-to-end docking between different shaft modules, respectively. For example, in the two middle modules 10 shown in FIG. 2, the first docking element of the upper middle module docks the second docking element of the lower middle module. In this example, the first docking element 110 is located at the lower end of the vertical structural part of the middle module, and the second docking element 120 is located at the upper end of the vertical structural part of the middle module. Except for the time for connecting the frames in the field, the gear rotation mechanism in the second docking element 120 is locked.

Figure 3:
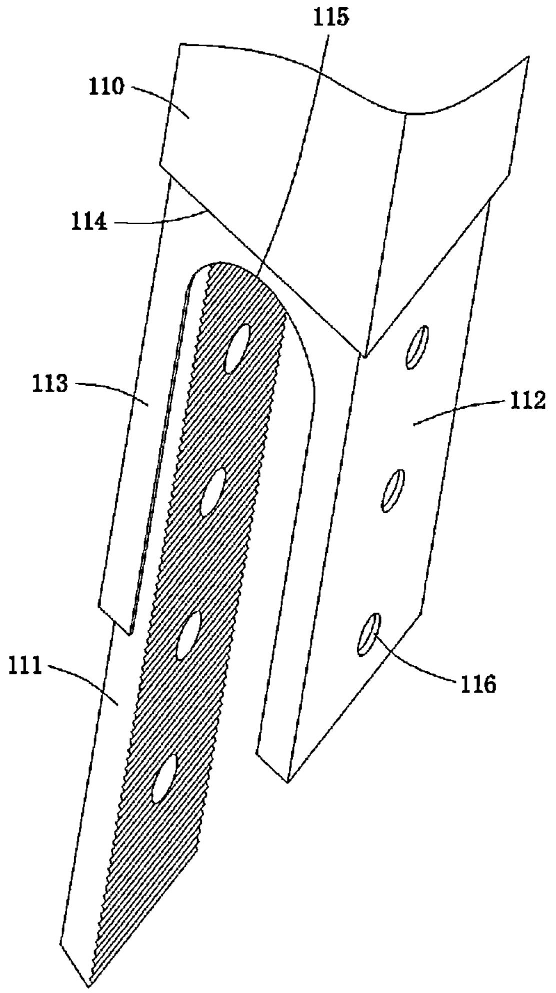
FIG. 3 schematically illustrates, in a perspective view, a first docking element of the docking mechanism in FIG. 2.

FIG. 3 schematically illustrates, in a perspective view, a first docking element of the docking mechanism in FIG. 2.

As shown in the figure, the first docking element 110 has a first adjusting element 111. According to this example, the first adjusting element 111 is a rack that is fixed to the first docking element 110. Here, the first docking element 110 is a hollow tube from one end of which the rack protrudes.

In this embodiment, the end of the hollow tube includes a first extension portion 112 extending longitudinally from the tube and relatively parallelly spaced apart from the rack. As can be seen from the figure, the first extension portion 112 has a connecting hole 116.

In this embodiment, the end of the hollow tube may further include a second extension portion 113 extending longitudinally from the tube and parallelly spaced apart from the first extension portion 112, with the second extension portion 113 conforming to and holding the rack. The second extension portion 113 may cover or adhere to the rack. The rack may be fixed to the hollow tube in various suitable manners, for example, but not limited to, welding, bolting (as illustrated schematically at the rack in FIG. 3 with several connecting through-holes), and the like.

Here, the hollow tube is a square tube. The first extension portion 112 and the second extension portion 113 are connected to the hollow tube with a shoulder 114, and a cross section formed of the first extension portion 112 and the second extension portion 113 is smaller than the cross section of the first docking element 110, i.e. the square tube. The first extension portion 112 and the second extension portion 113 are joined at the root and form an arcuate curved top surface 115 at the side wall connecting the two to prevent damage resulted from stress concentrations; this side wall can also function as a structural reinforcement.

Figure 4:
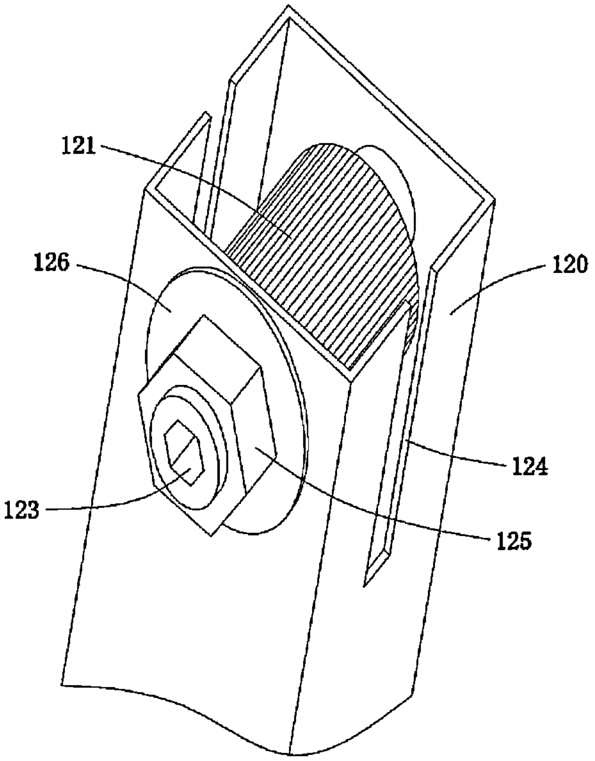
FIG. 4 schematically illustrates, in a perspective view, a second docking element of the docking mechanism in FIG. 2.

FIG. 4 schematically illustrates, in a perspective view, a second docking element of the docking mechanism in FIG. 2.

As shown in the figure, the second docking element 120 has a second adjusting element 121. In this illustrated example, the second adjusting element 121 is a gear that is disposed at the second docking element 120 in a rotatable adjusting manner. Here, the second docking element 120 is a hollow tube and the gear is disposed within one end of the hollow tube by an adjustable spindle 122. The spindle 122 may have an operating portion 123 for rotating the adjusting spindle. For example, but not limited to, the operating portion 123 may be a hex recess or a hex bolt head at the end of the spindle, which is easy to operate with a tool such as an internal hexagonal wrench or the like. Here, the hollow tube is a square tube.

The spindle 122 can be secured to the end of the hollow tube in the form of a bolt by screwing down with respect to the hollow tube of the second docking element 120 through a nut 125 (the other end of the spindle may also be provided with a nut or a bolt head). In optional embodiments, after securing, a mechanism may also be provided to lock the nut to prevent inadvertent loosening of the spindle 122. When the relative position of the first docking element 110 and the second docking element 112 needs to be adjusted, the nut 125 may be loosened, and then a tool is utilized to rotate the adjusting spindle 122 through the operating portion 123, and further adjust the gear and the rack. A gasket 126 may be disposed at the nut 125 of the spindle so as to prevent loosening.

As can also be seen in the figure, the hollow tube of the second docking element 120 has a slot 124 corresponding to the position of the connecting hole 116 of the first extension portion of the first docking element 110, at the corresponding docking end. The straight slot in the figure may further be deformed into other shapes. It may be appreciated that those skilled in the art are capable of making equivalent alterations to further substitute the slots and the like described herein with common connecting structures such as similar connecting holes, which also falls within the scope of the "slotted" structure herein.

Returning now to FIG. 2, it can be seen that the first docking element 110 can dock the second docking element 120 in an adjustable manner, and the rack serving as the first adjusting element 111 engages the gear serving as the second adjusting element 121, so that the docking position between the first docking element 110 and the second docking element 121 can be changed by adjusting the gear.

In the illustrated example, the rack is guided between the gears and the side walls of the hollow tube of the second docking element 120 into the respective ends of the hollow tube. Accordingly, the second extension portion 113 also extends into the second hollow tube. The first extension portion 112 also extends into the hollow tube of the second docking element 120. The shoulder 114 of the first docking element 110 is aligned with the end face of the second docking element 120; however, it may be appreciated that depending on the height adjustment of the first docking element 110 and the second docking element 120, the shoulder 114 of the first docking element 110 does not necessarily contact the end face of the second docking element 120.

The first extension portion 112 can be secured to the hollow tube of the second docking element 120 in a releasable manner. In one example, the connecting hole 116 of the first extension portion 112 is adapted to be secured with the slot 124 of the hollow tube of the second docking element 120 by a screw (not illustrated). For example, the screw is secured to the connecting hole by the threaded portion, and the slot 124 is tightened to the first extension portion 112 by the screw head portion to achieve the securing of the two. To achieve a more efficient securing, a plurality of screws may be employed for securing herein. In different embodiments, those skilled in the art may also employ other common securing means, for example, but not limited to, weld nut, short bolt plus gasket, or the like.

To facilitate engagement and adjustment of the gear and the rack, the spacing between the rack and the first extension portion 112 allows the gear to access. Alternatively, the spacing between the rack and the first extension portion 112 enables them to access the hollow tube of the second docking element 120 without interfering with the gears. At the same time, this enables the first extension portion 112 and the second extension portion 113 to enter the second docking element 120 or exit from the second docking element 120 as desired.

The outer profile shape formed of the first extension portion 112 and the second extension portion 113 matches the inner profile shape of the hollow tube of the second docking element, which makes the docking of the first docking element and the second docking element, as well as the engagement of the gear and the rack in a relatively stable state, without unexpected lateral loosening. In the illustrated example, the outer profile shape and the inner profile shape are both square shaped. In optional embodiments, those skilled in the art may also design these outer profile shapes and inner profile shapes as other matched shapes, such as circular, other polygonal shapes, heteromorphism, and the like.

In conjunction with the descriptions above with respect to FIGS. 2-4, it may be appreciated that upon docking operation using the docking mechanism 100, the rack of the first docking element 110 may be first guided into engagement with the gear of the second docking element 120 and then be rotated by the spindle driving the gear, to guide the rack, the first extension portion, and the second extension portion into place within the second docking element 120 as needed; finally, the spindle is secured by the nut 125 and the like, and the first extension portion is secured to the second docking element 120 with a securing means. When the docking mechanism needs to be adjusted, the securing between the first extension portion and the second docking element may be released first, and then the nut 125 of the secured spindle may be loosened to enable the spindle to rotate; and then the spindle is rotated by the tool or manually, driving the gear to rotate; the gear drives the rack, and the rack pushes the first docking element to move, thereby enabling the relative positional adjustment of the first docking element 110 and the second docking element; the spindle and the first extension portion may be secured to the second docking element again after the adjustment is completed. It may be appreciated that the order of operation of the nut and securing device may be changed while docking or adjusting.

In addition, it is noted herein that the embodiments in FIGS. 2-4 are merely exemplary and descriptive, wherein several features may be omitted or modified and other features may be added thereto as appropriate.

For example, the first extension portion 112 and the second extension portion 113 of the first docking element 110 may be omitted or in other feasible forms. Where the first extension portion 112 is omitted, the first docking element and the second docking element may be fixed by the force between the gear and the racks, or the rack may be further secured to the second docking element. Likewise, the same is true where the first docking element 110 and the second docking element 120 are not hollow tubes.

Figure 5:
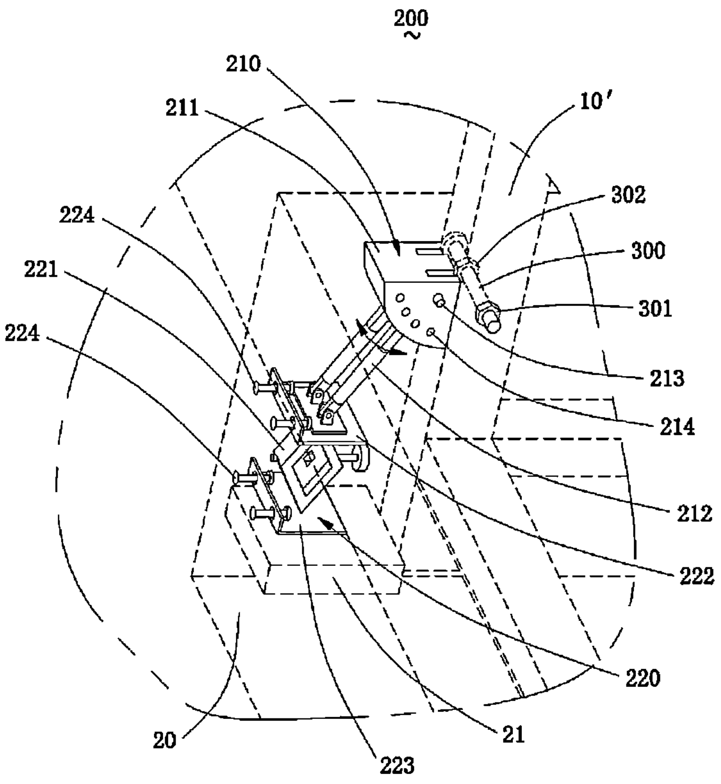
FIG. 5 schematically illustrates, in a perspective view, a docking mechanism according to another embodiment of the present invention.

FIG. 5 schematically illustrates, in a perspective view, a docking mechanism according to another embodiment of the present invention. The docking mechanism is shown in solid lines in the figure, and the elevator shaft of the building and the shaft module requiring relative installation are shown in dashed lines.

As can be seen in the figures, the docking mechanism 200 includes a first docking element 210 and a second docking element 220.

The first docking element 210 includes an indexing block 211 and at least one swing lever serving as a first adjusting element 212, the first end of the swing lever being connected to the indexing block 211 in an indexing pivotally adjustable manner. The indexing block 211 may be provided with a guiding slot (not illustrated) for guiding the swing of the swing lever, which provides space for the rotation of the swing lever 212. The pivot shaft 213, which is shared by the swing levers 212, is fixed to the indexing block 211 through the guiding slot. The indexing block 211 has at least two indexing holes 214 distributed around the pivot shaft 213 and passing through the guiding slots, with the swing lever fixed at the at least one indexing hole 214 by an indexing shaft or locating pin. In the illustrated example, the number of indexing holes is optionally four. While the indexing block 211 of illustrated in the figure is in the shape of a sector column, the indexing block 211 may have different shapes as desired in other optional embodiments.

The second docking element 220 includes a mechanical jack serving as the second adjusting element 221. The mechanical jack is in the form of a scissor jack (also referred to as a cradle jack) as shown in the figure, with a cradle that constructs a diamond shape and a leading screw for adjusting the waist width of the diamond. The jack is made vertically higher by narrowing the waist width of the diamond cradle by screwing the leading screw; and the jack is made vertically lower by widening the waist width of the diamond cradle by screwing the leading screw. Other forms of mechanical jacks may also be employed herein.

The mechanical jack may have a top plate 222 and a bottom plate 223 parallel to each other. The top plate 222 and bottom plate 223 may be arranged horizontally. The top plate 222 and/or the bottom plate 223 are respectively secured with supporting legs 224 that protrude from a first side of the top plate 222 and/or the bottom plate 223, and that may be parallel to the plane of the top plate 222 and/or the bottom plate 223 and parallel to the swing plane of the swing lever. For structural reliability, the top plate 222 and/or the bottom plate 223 may have vertical edgefolds at the edges of its first side, respectively, and the support legs 224 are formed at the edgefolds. It may be appreciated that the edgefolds may also be omitted.

As can be seen in the figure, the second end of the swing lever, i.e., the lower end in the figure, is connected to the top of the mechanical jack in a hinged manner. In the illustrated example, the second end of the swing lever is connected to a top surface of the top plate 222.

Also shown in FIG. 5 in dashed lines is an elevator shaft 20 of a building and a shaft module 10' that requires relative installation. In the illustrated example, the indexing block of the docking mechanism may be secured to the side of the shaft module 10' by the method of welding or the like. Accordingly, docking mechanisms are also symmetrically arranged on opposite sides of the shaft module 10'. The floor of the jack of the docking mechanism rests at the shaft module supporting platform 21 of the corresponding floor within the shaft of the building, and each supporting leg 224 rests against the interior wall of the shaft of the building.

As the shaft module is installed, the angle adjustment of the swing lever relative to the indexing block may adjust the alignment of the floor of the jack to the supporting platform. By adjusting the swing lever upward by one stage, the adjusting element including the jack may be moved further away from the frame of the shaft module, equivalent to pushing the frame away from the inner wall of the shaft. By adjusting the swing lever downward by one stage, the adjusting element including the jack may be moved closer to the frame of the shaft module, equivalent to making the frame closer to the inner wall of the shaft. This indexing adjustment can affect the height of the shaft module at the same time, which can be eliminated by adjusting the mechanical jack.

Adjustment of the jack height by the leading screw may then adjust the height of the shaft module relative to the elevator shaft, provide reliable support for the shaft module, advantageously distributing the gravity of the shaft module onto the supporting platform of the building shaft. When the height of the shaft module needs to be adjusted, the adjustment may be achieved by adjusting the height of the mechanical jack by rotating the leading screw. The adjustment of the leading screw, which may be accomplished by hand, may also be remotely or automatically controlled by a motor and a control device.

Figure 6:
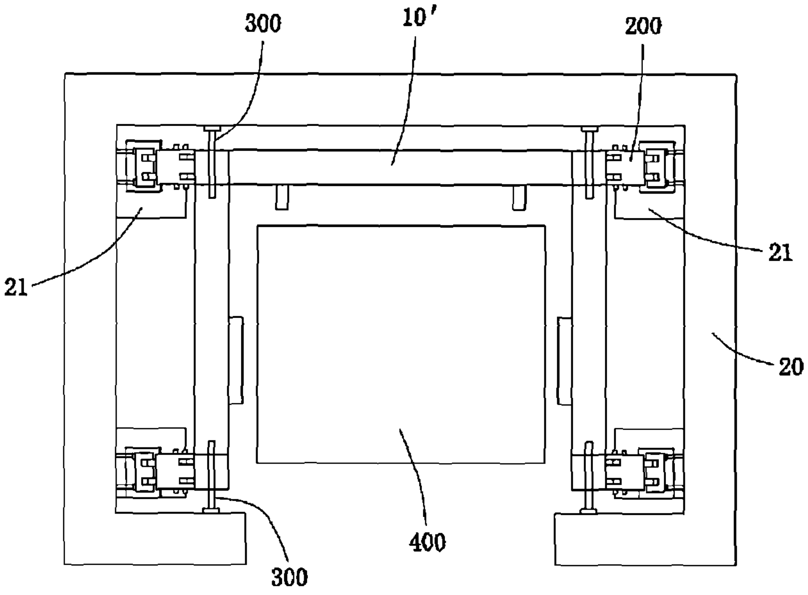
FIG. 6 schematically illustrates, in a plan view, the docking mechanism in FIG. 5.

FIG. 6 schematically illustrates, in a plan view, the docking mechanism in FIG. 5.

Specifically, a shaft 20, a shaft module 10', and an elevator car 400 of a building, and a docking mechanism 200 and a supporting bolt 300 are shown in FIG. 6. In an example, the cross sections of the shaft 20, the shaft module 10', and the car are square, respectively. The docking mechanism 200 is used to mount, support, and align the shaft module 10' on the supporting platform 21 of the shaft 20. Four docking mechanisms 200 are shown in the figure, with two docking mechanisms disposed on the left and right sides of the shaft module, respectively, which are disposed at respective sides of the shaft module in tandem, respectively.

In FIG. 6, the supporting bolt 300 passes through the frame of the shaft module and protrudes from the shaft module toward the back side, and are respectively supported on the respective front and back side walls of the shaft of the building. Referring to FIG. 5, it can be seen that the supporting bolt 300 can be provided with a nut 301 and a nut 302. The nut 301 and nut 302 sandwich the frame of the shaft module, wherein the position of the frame on the bolt can be adjusted by moving the position of the nuts 302, 304 on the bolt, thereby adjusting the forward and backward position of the shaft module within the shaft of the building. Alternatively, the nut may be secured, and the rotation of the supporting bolt may be utilized to effect forward and backward adjustment of the shaft module. The end of the supporting bolt 300 is formed with a disk shaped portion that can rest against the inner shaft. If the supporting bolt 300 is adjusted to be shorter, the frame is closer to the shaft wall; and if the supporting bolt 300 is adjusted to be longer, the frame is farther away from the shaft wall.

Some aspects of the present invention provide an elevator shaft module. For example, the elevator shaft module includes a docking mechanism corresponding to the example shown in FIGS. 2-4 (e.g., the first docking element and the second docking element thereof may be located at the connecting ends of the frame of an elevator shaft module, respectively) and/or a docking mechanism corresponding to the example shown in FIGS. 5-6 (e.g., the first docking element thereof may be fixed to the side of the frame of the elevator shaft module). In certain embodiments, both docking mechanisms may be disposed simultaneously.

Some aspects of the present invention also provide an elevator system. For example, the elevator system may include a docking mechanism for docking of adjacent shaft modules (e.g., the docking mechanisms illustrated in FIGS. 2-4, where the docking of adjacent elevator shaft modules is achieved through the first docking element and the second docking element of each other) and/or a docking mechanism for the shaft module to dock the shaft of the building (e.g., the docking mechanism illustrated in FIGS. 5-6, where the second docking element of the docking mechanism is supported at a respective floor of the building shaft of the elevator system). In addition, as shown in FIG. 6, the shaft module of the elevator system also has a supporting bolt 300 protruding outwardly from the back side frame of the module.

It can be appreciated that in such an elevator system, the docking mechanism (e.g., docking mechanism 100) between the shaft modules is adapted to perform alignment, perpendicularity, parallelism, and precision adjustment during module docking, and to ensure the perpendicularity and parallelism of the guide rails in the shaft module; for example, in FIG. 1, four docking mechanisms 100 are utilized to adjust the docking of the four vertical structural parts 11, respectively, to adjust the shaft module to substantially adapt to the deviation or error of the building, up to the accuracy of a millimeter level. After adjusting the docking mechanism between the shaft modules to determine the accuracy, the shaft module may be fixed to the building shaft by the docking mechanism (e.g., docking mechanism 200) between the shaft module and the building shaft, and the weight of the shaft module is distributed to the building; for example, in FIG. 5, the adjustable position of the swing lever is provided with the indexing block and locked at an appropriate indexing position, enabling the supporting bolt to resting against the inner wall of the shaft to prevent waggling and ensuring angular positioning; then the height of the mechanical jack is adjusted to enable the weight distribution to the supporting platform within the shaft of the building, and thereby distribute the weight onto the load beam of the building. After the constructing of the shaft module corresponding to one floor is completed by the docking mechanism as above, the constructing of the shaft module of the above adjacent floor may continue through the docking mechanism; and so on, the constructing of the bottom module, the middle module, and the top module of the elevator system may be achieved.

New dimensional errors may arise between the shaft module and the building shaft during operation of the elevator system. In some aspects presented in the invention, the docking mechanism is rotated through the rack and the gear, wherein the angle and distance of the gear rotation may be controlled with a dedicated wrench, and the adjustment accuracy being of millimeter level; the height dimension of the modular design may be effectively associated to the height error of the building, the structural adjustment design is reliable, low in cost, and maintains the good quality of the modular frame connection. The docking mechanisms in the further aspects presented in the invention and the shaft module or elevator system with it are able to readjust the position and pose of the shaft module of the modular elevator through the docking mechanism. Certain aspects of such docking mechanism also provide advantages of reliability, ease to use, and sufficient adjustment range, and can effectively eliminate the negative effects of the errors in the shaft dimension. At the same time, the docking mechanism also helps to readjust newly generated errors during operation.

The technical scope of the present invention is not limited solely to the content in the foregoing description, but those skilled in the art may make numerous variations and modifications to the embodiments described above without departing from the technical concepts of the present invention, and that such variations and modifications are intended to fall within the scope of the present invention.

What is claimed is:

1. Elevator shaft modules comprising:

docking mechanism comprising:

a first module including a first docking element having a first adjusting element; and a second module including a second docking element having a second adjusting element, wherein the first docking element is adapted to dock the second docking element in an adjustable manner, and the first adjusting element is adapted to engage the second adjusting element such that a docking position between the first docking element and the second docking element is changeable by adjusting one of the first adjusting element and the second adjusting element;

wherein the first docking element is located at an end of a frame of the first module and the second docking element is located at an end of a frame of the second module;

wherein the first adjusting element is a rack fixed to the first docking element, and the second adjusting element is a gear, the gear being disposed at the second docking element in a rotatable adjusting manner.

2. The elevator shaft modules of claim 1, wherein the first docking element is a first hollow tube, the second docking element is a second hollow tube, the rack protrudes from one end of the first hollow tube, the gear is disposed within one end of the second hollow tube by an adjustable spindle, and the rack is adapted to be guided between the gear and a sidewall of the second hollow tube into the end of the second hollow tube.

3. The elevator shaft modules of claim 2, wherein the spindle has an operating portion for rotating and adjusting the spindle.

4. The elevator shaft modules of claim 2, wherein the end of the first hollow tube includes a first extension portion extending longitudinally therefrom and parallelly spaced apart from the rack, and, the first extension portion is adapted to extend into the second hollow tube, and the first extension portion is adapted to be secured to the second hollow tube in a releasable manner.

5. The elevator shaft modules of claim 4, wherein the first extension portion has a connecting hole and the end of the second hollow tube has a slot corresponding to the position of connecting hole, the connecting hole being adapted to be secured with the slot by a screw.

6. The elevator shaft modules of claim 4, wherein the end of the first hollow tube includes a second extension portion extending longitudinally therefrom and parallelly spaced apart from the first extension portion, the second extension portion conforms to and holds the rack, and the second extension portion is adapted to extend into the second hollow tube, an outer profile shape formed by the first extension portion and the second extension portion matches the inner profile shape of the second hollow tube.

7. The elevator shaft modules of claim 2, wherein the first hollow tube and the second hollow tube are both square tubes.

8. An elevator system comprising the docked elevator shaft modules of claim 1, wherein docking of adjacent elevator shaft modules is achieved by the first docking element and the second docking element of each other.

* * * * *